(12) United States Patent
Perkins et al.

(10) Patent No.: US 8,544,867 B1
(45) Date of Patent: Oct. 1, 2013

(54) TOW BAR BALANCE SYSTEM

(75) Inventors: Neil Perkins, Northfield, MN (US);
John Ehr, Farmington, MN (US)

(73) Assignee: Perkins Motor Transport Inc.,
Northfield, MN (US)

( * ) Notice: Subject to any disclaimer, the term of this patent is extended or adjusted under 35 U.S.C. 154(b) by 0 days.

(21) Appl. No.: 13/342,848

(22) Filed: Jan. 3, 2012

Related U.S. Application Data

(60) Provisional application No. 61/429,185, filed on Jan. 3, 2011.

(51) Int. Cl.
  *A01D 67/00* (2006.01)
(52) U.S. Cl.
  USPC ........ 280/462; 280/463; 280/479.2; 280/488; 280/493; 280/494
(58) Field of Classification Search
  USPC ............... 280/462, 463, 479.2, 488, 493, 494
  See application file for complete search history.

(56) References Cited

U.S. PATENT DOCUMENTS

| | | | |
|---|---|---|---|
| 3,414,294 A | 12/1968 | Moulton | |
| 3,649,046 A | 3/1972 | Mathisen | |
| 3,866,935 A * | 2/1975 | Nelson | 280/43.23 |
| 4,313,616 A * | 2/1982 | Howard | 280/455.1 |
| 4,943,078 A | 7/1990 | McGhie et al. | |
| 5,152,545 A | 10/1992 | Hupperts et al. | |
| 5,240,273 A | 8/1993 | Stead et al. | |
| 5,244,226 A * | 9/1993 | Bergh | 280/442 |
| 5,375,866 A | 12/1994 | Wagner | |
| 6,311,954 B1 | 11/2001 | Breslin et al. | |
| 6,345,943 B1 | 2/2002 | Lawson et al. | |
| 6,692,218 B2 | 2/2004 | Grile | |
| 6,796,572 B1 | 9/2004 | McGhie et al. | |
| 6,942,232 B1 | 9/2005 | McGhie et al. | |
| 7,011,329 B2 | 3/2006 | Yoder | |
| 7,134,829 B2 | 11/2006 | Quenzi et al. | |
| 7,159,888 B1 | 1/2007 | Sutton et al. | |
| 7,188,680 B2 | 3/2007 | Almen | |
| 7,213,824 B1 | 5/2007 | McGhie et al. | |
| 7,216,896 B1 | 5/2007 | McGhie et al. | |
| 7,448,839 B2 | 11/2008 | Grile | |
| 7,506,885 B2 | 3/2009 | Colibert | |
| 7,562,887 B1 | 7/2009 | Sutton et al. | |
| RE41,126 E * | 2/2010 | Hurlburt | 414/482 |
| 7,686,320 B1 | 3/2010 | McGhie et al. | |
| 8,016,316 B1 * | 9/2011 | Carlton | 280/656 |
| 2003/0085562 A1 | 5/2003 | Sparling | |
| 2007/0108731 A1 | 5/2007 | McBroom | |
| 2008/0246253 A1 * | 10/2008 | Timmons | 280/442 |
| 2008/0315558 A1 | 12/2008 | Cesternino | |
| 2009/0273159 A1 | 11/2009 | Sutton | |

\* cited by examiner

*Primary Examiner* — Tashiana Adams
*Assistant Examiner* — Marlon Arce
(74) *Attorney, Agent, or Firm* — Dietz Law Office LLC

(57) ABSTRACT

An apparatus and method is described for offsetting a lifting or lowering weight of a tow bar attached to a trailer. The apparatus includes nitrogen accumulators coupled in series to a hydraulic cylinder. The accumulators include volumes of hydraulic fluid and a gas, such as nitrogen, which are preset to have differing nitrogen pressures to accommodate a full range of motion. After initial system pressurization, no separate power source is needed to provide hydraulic support at static conditions, oscillation of the tow bar below horizontal, and lift support from horizontal to a positive angle, allowing the user to lift and position a heavy tow bar several feet with minor user force.

17 Claims, 5 Drawing Sheets

TOW BAR BALANCE SYSTEM

CROSS-REFERENCE TO RELATED APPLICATIONS

This application claims the filing benefit and priority of U.S. Provisional Application Ser. No. 61/429,185 filed Jan. 3, 2011, the contents which are incorporated herein by reference in its entirety.

FEDERAL SPONSORSHIP

Not Applicable

JOINT RESEARCH AGREEMENT

Not Applicable

TECHNICAL FIELD

This invention pertains generally to the tow bar of a trailer suitable for use in either off-highway or highway travel. This invention also pertains to tow bars coupled to heavy agricultural implements and oversize trailers suitable for on and off highway use to transport overweight and over dimensional loads at low or high speeds.

BACKGROUND

Generally, trailers for hauling oversize, overweight, and over length loads have previously been described. These heavy loads may include, for example, cranes, agricultural implements, concrete structures, construction equipment, construction materials, oversized vehicles or the like. Prior trailers capable of transporting massive or heavy loads typically include multiple axles and massive tow bars and tongues coupled to the trailer frame. Often, these heavy haul trailers must provide some level of support under the cargo, throughout the length of the cargo, to help reduce the torsional and related forces the cargo may be subjected to during transport and the tow bar must withstand the required towing forces applied to the trailer. Further, sloped and uneven roads may cause additional torsional stress on the cargo and tow bar. These potential applied forces require a tow bar of sufficient strength and mass to withstand these forces.

Due to weight of the tongue, prior tow bars are typically difficult to connect out in the field manually without using some sort of additional equipment to lift the heavy tow bar sufficiently high to connect to a hitch of a towing vehicle. Also, when the tow bar is rigidly fixed to the frame of the trailer, lifting the tow bar also requires lifting a proportional weight of the trailer distributed to the tongue or tow bar of the trailer. To reduce the required lifting force, prior tow bars have been hinged with mechanisms coupled to the tow bar to apply an upward force to the tongue to aid the user in lifting the tow bar. However, when lowering a tow bar having these prior mechanisms a user must counteract the force of the mechanism to lower the tow bar. Further, prior tow bars are labor intensive to connect and disconnect.

Hence, there is a need for a tow bar capable of use on a trailer system towable over smooth and rough terrains at both low and high speeds. There is also a need for a tow bar that is easily lifted and coupled to a tow vehicle hitch without the need for additional fork lifts, skid loaders or other lift equipment.

SUMMARY

Embodiments according to the invention include a trailer capable of use on smooth and rough terrains at both low and high speeds. Aspects of the invention include a balanced tow bar that requires minimal force to lift and couple to a tow vehicle. A tow bar of the invention includes a tongue, hydraulic cylinder and first and second accumulators. The tongue has a first end that may couple to a vehicle and a second end adapted to couple to a trailer. The hydraulic cylinder has a first end coupled to the tongue and a second end adapted for coupling to the trailer. The accumulators are pressurized with a gas and are in fluid communication with the hydraulic cylinder. A hydraulic fluid hand pump may be coupled in fluid communication with said hydraulic cylinder to distribute hydraulic fluid into the hydraulic lines and to distribute additional hydraulic fluid into the hydraulic lines as needed. The accumulators may include a gas port to increase or decrease the amount of gas in the accumulators.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various drawings, which are not necessarily drawn to scale, further description of the inventive aspects of the invention are included and described on the drawings which are incorporated by reference into the description of the invention. Like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Prior heavy haul trailer systems typically include a tractor and a trailer combination that can include a front tow vehicle (or tow trailer), connection linkages from front to rear, and a rear dolly (or trailer) system along with provisions made at the top of the front and rear trailers to reduce contact stresses to the cargo. The tow vehicle or tractor can be connected either via a fifth wheel or a tow bar mechanism. Prior platform trailers used for off-highway use are typically equipped with a tow bar, single axles, steering struts, and a platform that allows for placement of larger oversize loads on the jobsite or at other off-highway locations.

Figure 1:
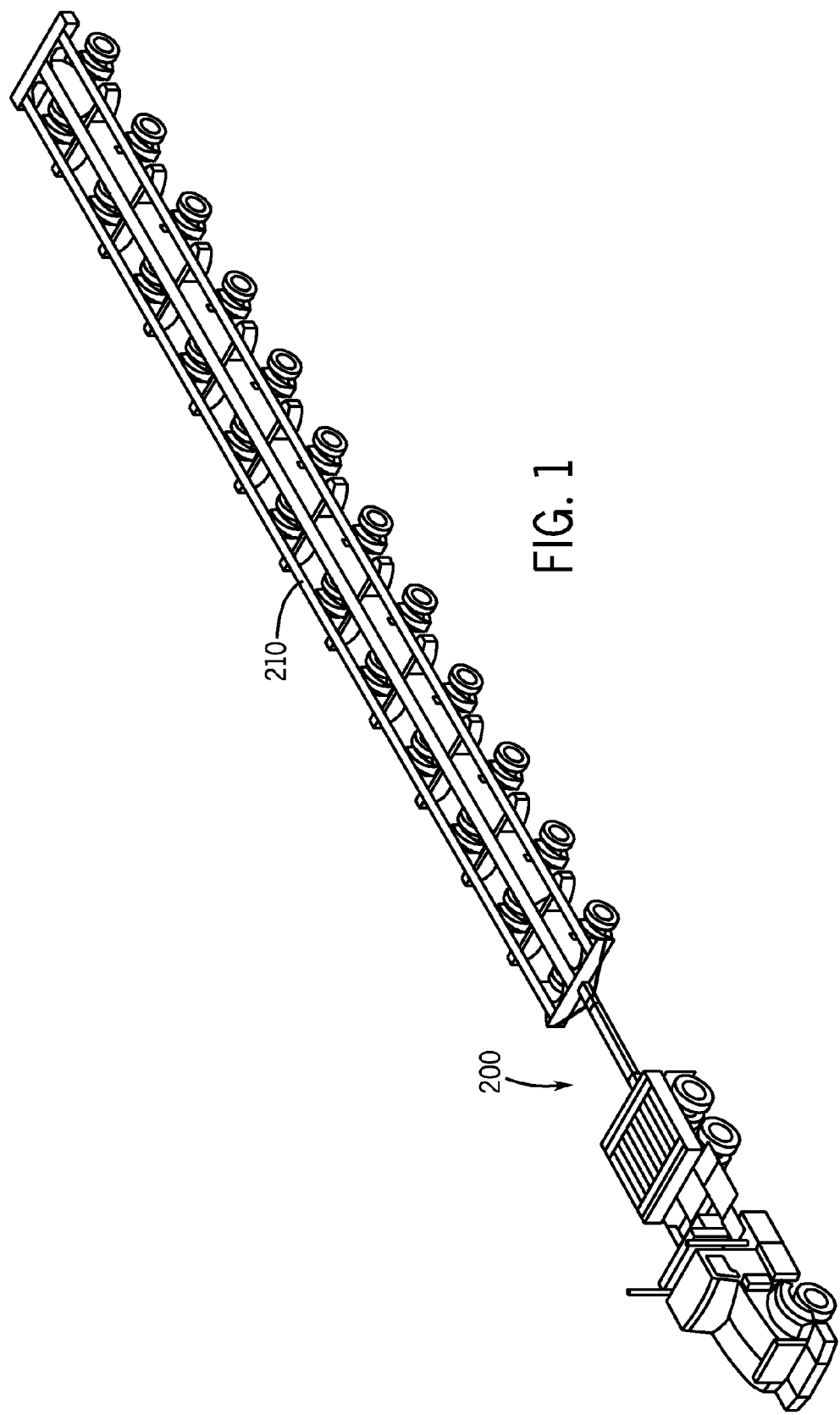
FIG. 1 is a side elevation view of a vehicle attached to a trailer with a tow bar in accordance with the present invention.
Figure 2:
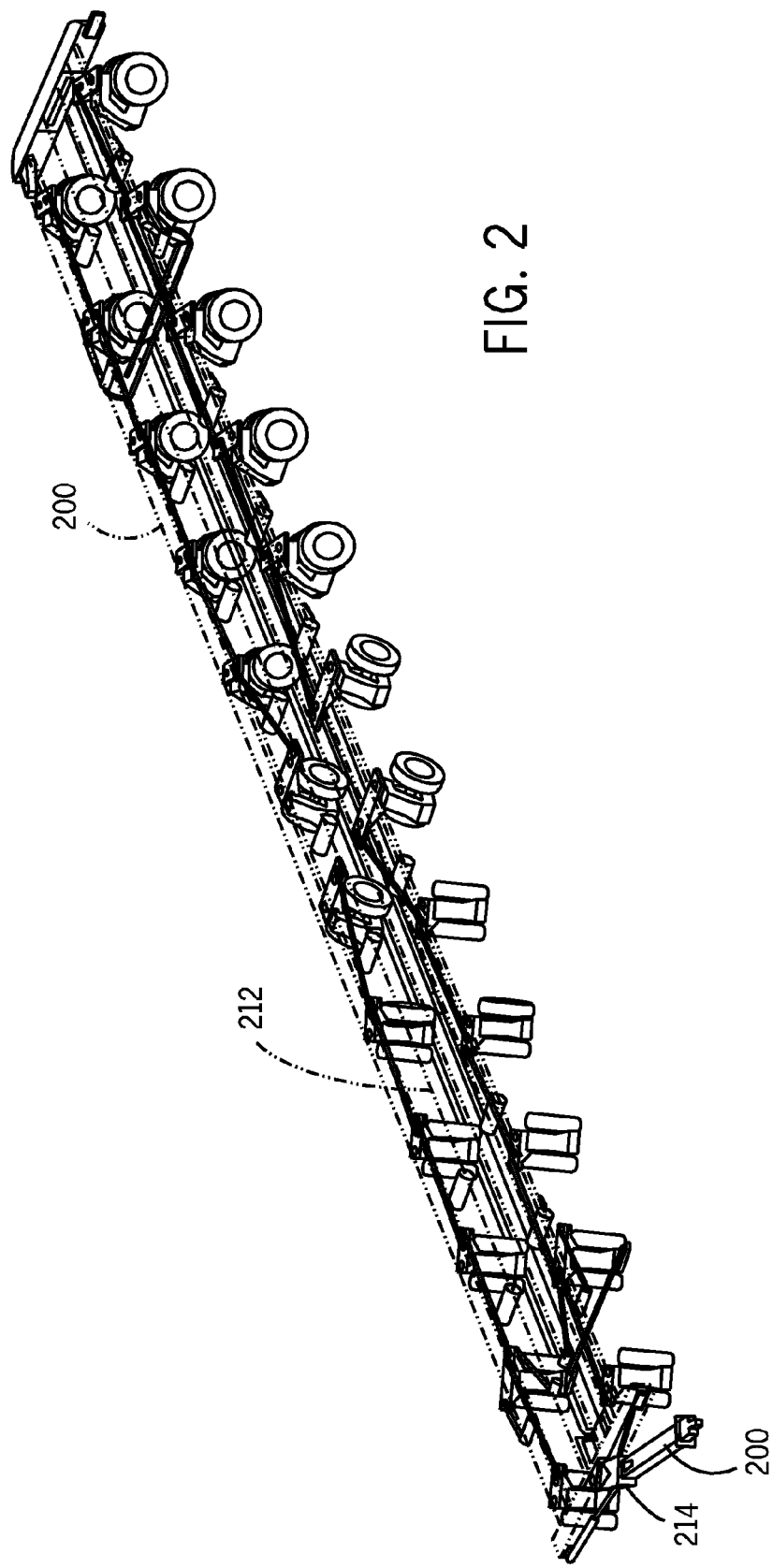
FIG. 2 is a top perspective view of a trailer having a tow bar attached to a vehicle in accordance with the present invention.

FIGS. 1 and 2 illustrate a trailer having a tow bar 200 of the present invention used for both on and off highway use. The trailer 210 is shown having a frame or framework 212 including a single carriage or spine with a swivel and hinge 214 coupled to an end of the frame 212. The tow bar 200 is pivotally attached to the hinge 214. Those skilled in the art will appreciate that the tow bar 200 of the present invention may be attached to other trailer frameworks without departing from the scope of the present invention.

Figure 3:
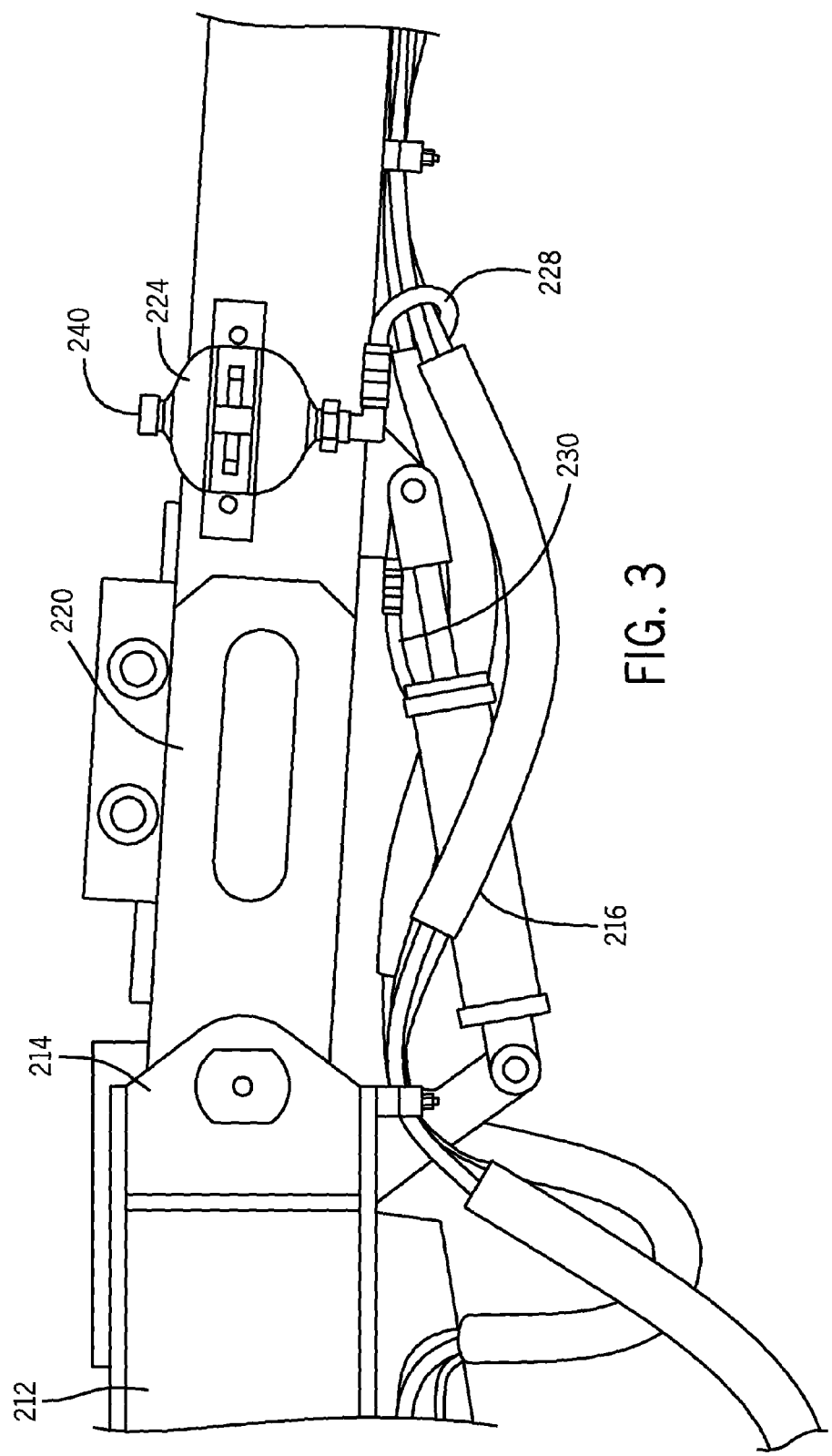
FIG. 3 is a side perspective view of a portion of the tow bar in accordance with the present invention.
Figure 4:
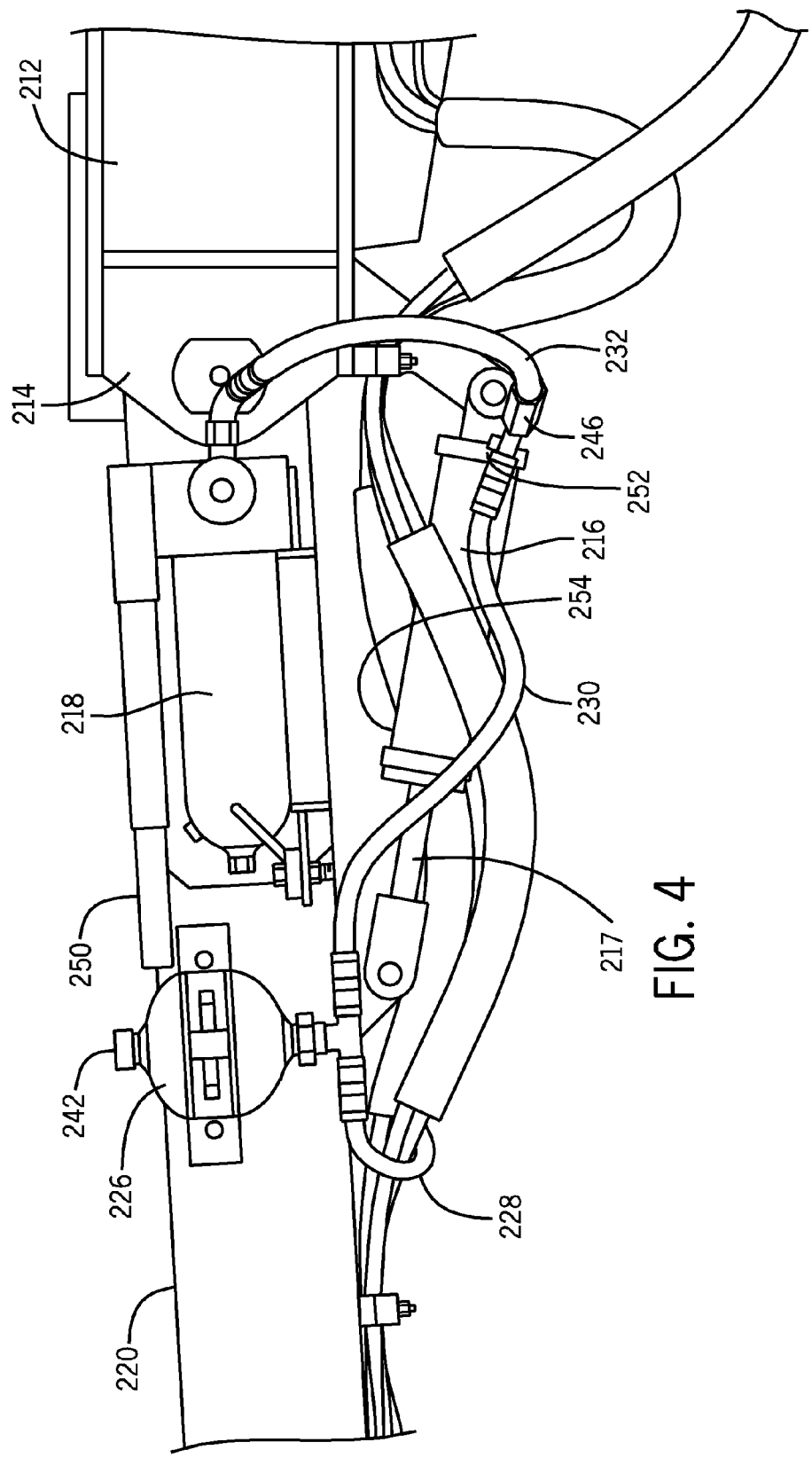
FIG. 4 is a side perspective view of a portion of the tow bar in accordance with the present invention opposing the side shown in FIG. 3.
Figure 5:
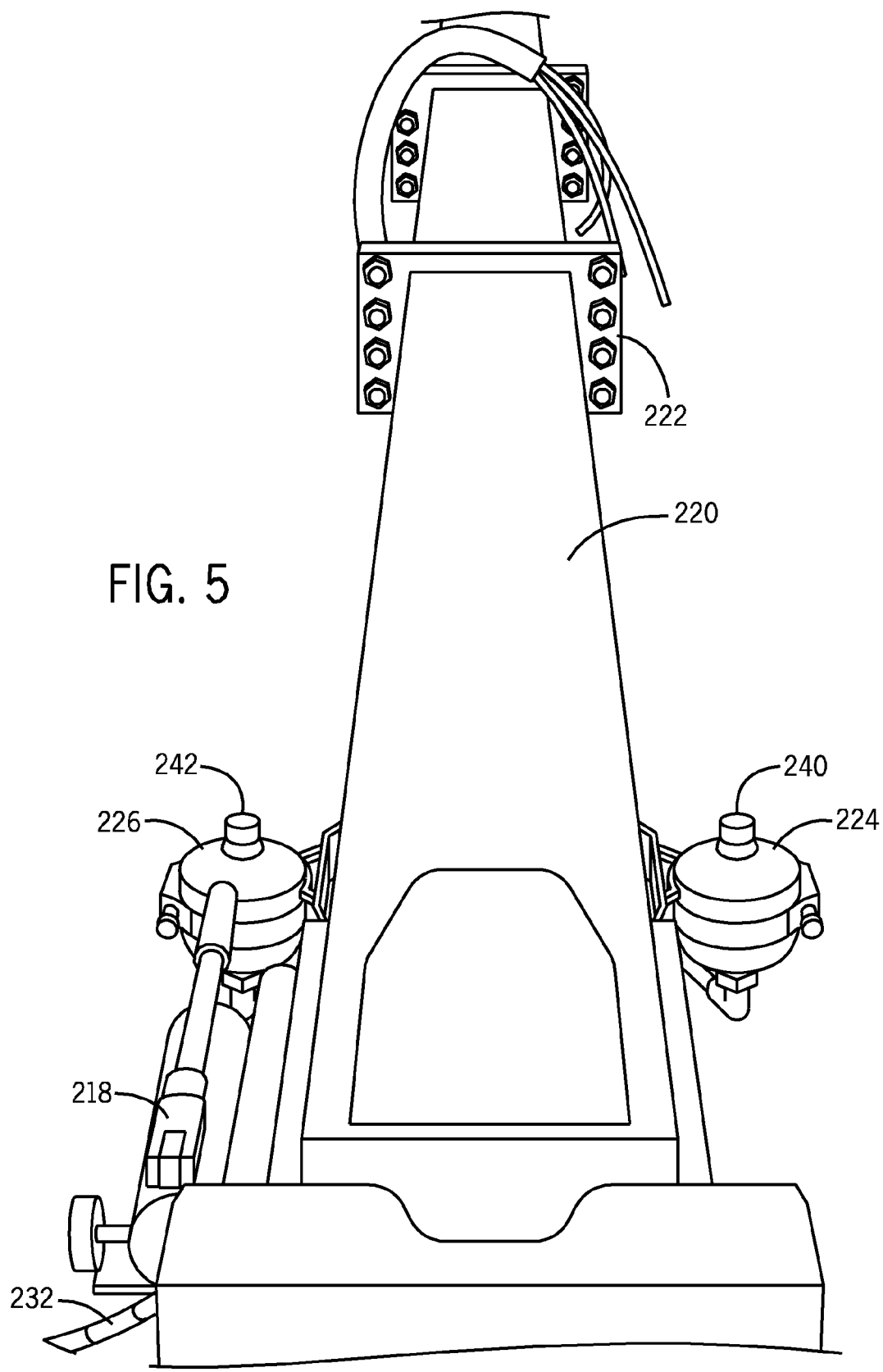
FIG. 5 is a top rear perspective view of a portion of the tow bar tongue in accordance with the present invention.

The tow bar system 200 of the present invention is shown in greater detail in FIGS. 3-5. The tow bar system includes a tongue 220 that may include a tractor hitch of known suitable construction coupled on one end of the tongue and a hinge 214 coupled to another end of the tongue. The tongue may also include a bolt connected segment interface 222 to allow a user to vary tow bar lengths depending on regulations and performance requirements. The tow bar system also includes a hydraulic cylinder 216 coupled to the tongue 220 and trader frame 212. In the embodiment shown in FIG. 3, an extendable end of a hydraulic support cylinder 216 is mounted to the tongue 220 and the hinge and swivel bar 214 is adapted to receive the other end of the hydraulic support cylinder 216. By connecting the tow bar 200 to a hinge and swivel, the tow bar may pivot both up and down and side to side.

The tow bar 200 system also includes a hydraulic fluid hand pump 218 mounted to the tow bar and coupled in fluid communication with the hydraulic cylinder 216 through hydraulic line 232. A preferred hand pump of suitable construction possesses a pressure rating in a range of 3,000-10,000 psi, an oil volume per stroke of 0.91 to 0.19 cubic inches, and an oil capacity of 30-70 cubic inches. The hand pump 218 includes a port 250 that allows for initial charge or recharging of the hydraulic lines. The size of the hydraulic cylinder 216 and pressure range of the hydraulic cylinder are dependent upon the tow bar weight, Center Of Gravity (COG) of the tongue 220, and desired up/down range of motion necessary for tow bar elevation range. The preferred pressure range is between 900 psi & 1,400 psi for the expected range of tongue weights for heavy haul trailers.

The tow bar system also includes two accumulators 224 and 226 that are mounted on the tow bar, one on each side of tongue 220, and that are coupled in series in fluid communication with hydraulic support cylinder 216. Each hydraulic accumulator 224, 226 includes a gas charging port 240 and 242 respectively. The tow bar hydraulic cylinder includes a quick coupler connection 246, of known suitable construction, that may be used to charge or provide pressure to the system during assembly, a bleed port 252 to evacuate air during internal charging of the system, and a breather 254 on the rod end 217 of the hydraulic cylinder 216. A closed hydraulic circuit is setup with the hand pump 218, cylinder 216, and low/high pressure accumulators 224/226.

The accumulators have a fixed volume that may contain both hydraulic fluid and a gas. The accumulators may be pressurized with the gas by charging the accumulators with the gas, nitrogen for example, through the charging ports 240 and 242. The accumulators are set with differing gas or nitrogen pressures prior to system use. The pressure of the gas within each accumulator applies a force against the hydraulic fluid within the accumulator and through the hydraulic lines 228 and 230 to the hydraulic cylinder 216. The pressurized hydraulic fluid applies a force against the cylinder rod 217 to force the rod out of the cylinder body. The mass of the tongue counteracts this force but when sufficient pressure is applied to the hydraulic fluid the rod 217 will extend out of the cylinder body.

The higher pressure accumulator 226 provides a volume and pre-charge to the hydraulic cylinder 216 so that the tow bar may be balanced at static conditions. The volume of gas within the accumulator 226 also allows for oscillation of the tongue 220 below horizontal to a desired angle, for example, 15 degrees below horizontal. The low pressure accumulator 224 provides sufficient suspension pre-charge to aid in vertical lift, and sufficient accumulator gas volume to provide for adequate hydraulic fluid displacement to ease range of motion. Those skilled in the art will appreciate that since the gas pressure in accumulator 224 is low, a downward force on the tongue will displace hydraulic fluid into the accumulator 224 reducing the volume of gas and increasing the pressure of the gas therein. The range of motion of the tow bar with minimal required force eases displacement in the vertical direction, and eases ability to setup and maneuver manually at the jobsite and connect at the tractor. Essentially, the hydraulic accumulators 224 and 226 provide a "balance" to the tongue so that reduced upward or downward force on the tongue is required to move the tongue respectively upward or downward.

After initial system pressurization, no separate power source is needed, other than a slight force on the tongue 220 from a user to actuate the cylinder. Further, the gas or nitrogen pressure within each accumulator 224 and 226 can be adjusted externally to provide more or less force against the cylinder rod. The dissimilar gas pressures within accumulators 224 and 226 further provides an opportunity for the user to balance between tow bar weight, Center Of Gravity (COG) of the tongue, and desired up/down range of motion.

During use, a user may charge the accumulators 226 and 224 to a calculated theoretical charge so that the nitrogen pressure from the accumulators will provide the balance and assist range of motion required. For example without limitation intended, a towbar of sufficient weight for heavy hauling may require a charge of 870 psi in the high pressure accumulator 226 and 360 psi in the low pressure accumulator so that the tow bar balances at neutral. The low pressure setting is determined as a function of the desired range of motion of the tow bar above neutral. Once the accumulators 226 and 224 are charged, the user may charge the hydraulic fluid lines 228, 230, and 232 with hydraulic fluid. When the lines are filled with sufficient fluid and air is bled from the lines (bleeder valve 252 and breather port 254 may be utilized), the tongue may be elevated to horizontal and balance itself. The nitrogen charge can be varied in accumulators 226 and 224 to modify amount of assistance and amount of support provided.

A user may charge the hydraulic fluid lines 228, 230 and 232 with a hydraulic fluid utilizing an external hydraulic supply unit. The nitrogen pressure within accumulator 226 and 224 and the pressure of the hydraulic fluid within the cylinder 216 is of sufficient charge so that the force of the hydraulic fluid against the cylinder rod is of sufficient force to overcome the downward force of the mass of the tongue 220. Increasing the gas pressure within accumulator 226 will increase the force applied by the hydraulic fluid to the cylinder rod 217. Once the desired balance is achieved, when the user applies a slight upward or downward force against the tongue, the hydraulic fluid in the lines is displaced and the gas volume within accumulator 224 is either increased or decreased.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A tow bar suitable for use with a trailer, comprising
    a tongue having a first end adapted to couple to a vehicle and a second end adapted to couple to a trailer;
    a hydraulic cylinder having a first end coupled to said tongue and a second end adapted for coupling to the trailer;
    a first accumulator pressurized with a gas in fluid communication with said hydraulic cylinder;
    a second accumulator pressurized with a gas in fluid communication with said hydraulic cylinder; and
    wherein a gas pressure within said first accumulator is greater than a gas pressure within said second accumulator.

2. The tow bar as recited in claim 1, further including a hydraulic fluid hand pump coupled in fluid communication with said hydraulic cylinder.

3. The tow bar as recited in claim 1, further including a first gas port coupled to said first accumulator to increase or decrease the amount of gas in said first accumulator.

4. The tow bar as recited in claim 1, further including a second gas port coupled to said second accumulator to increase or decrease the amount of gas in said second accumulator.

5. The tow bar as recited in claim 1 wherein said first and second accumulators are coupled in series to said hydraulic cylinder.

6. The tow bar as recited in claim 1 wherein said first accumulator includes hydraulic fluid contained within a portion of said first accumulator.

7. The tow bar as recited in claim 1 wherein said second accumulator includes hydraulic fluid contained within a portion of said second accumulator.

8. A tow bar suitable for use with a trailer, comprising
    a tongue having a first end adapted to couple to a vehicle and a second end adapted to couple to a trailer;
    a hydraulic cylinder having a first end coupled to said tongue and a second end adapted for coupling to the trailer;
    a first accumulator having a volume of hydraulic fluid and nitrogen within said first accumulator and in fluid communication with said hydraulic cylinder;
    a second accumulator having a volume of hydraulic fluid and nitrogen within said second accumulator and in fluid communication with said hydraulic cylinder; and
    wherein a nitrogen pressure within said first accumulator is greater than a nitrogen pressure within said second accumulator.

9. The tow bar as recited in claim 8, further including a hydraulic fluid hand pump coupled in fluid communication with said hydraulic cylinder.

10. The tow bar as recited in claim 8, further including a first nitrogen port coupled to said first accumulator to increase or decrease the volume of nitrogen in said first accumulator.

11. The tow bar as recited in claim 8, further including a second nitrogen port coupled to said second accumulator to increase or decrease the volume of nitrogen in said second accumulator.

12. The tow bar as recited in claim 8 wherein said first and second accumulators are coupled in series to said hydraulic cylinder.

13. A tow bar suitable for use with a trailer, comprising
    a tongue having a first end adapted to couple to a vehicle and a second end adapted to couple to a trailer;
    a hydraulic cylinder having a first end coupled to said tongue and a second end adapted for coupling to the trailer;
    a first accumulator having a volume of hydraulic fluid and pressurized gas within said first accumulator and in fluid communication with said hydraulic cylinder;
    a second accumulator having a volume of hydraulic fluid and pressurized gas within said second accumulator and in fluid communication with said hydraulic cylinder; and
    wherein said first and second accumulators are coupled in series to said hydraulic cylinder.

14. The tow bar as recited in claim 13, further including a hydraulic fluid hand pump coupled in fluid communication with said hydraulic cylinder.

15. The tow bar as recited in claim 13, further including a first gas port coupled to said first accumulator to increase or decrease the volume of pressurized gas in said first accumulator.

16. The tow bar as recited in claim 13, further including a second gas port coupled to said second accumulator to increase or decrease the volume of pressurized gas in said second accumulator.

17. The tow bar as recited in claim 13 wherein a pressure within said first accumulator is greater than a pressure within said second accumulator.

* * * * *